(12) United States Patent
Ploeger

(10) Patent No.: US 6,920,961 B2
(45) Date of Patent: Jul. 26, 2005

(54) GREASE FITTING COUPLER

(75) Inventor: Randall J. Ploeger, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 10/167,022

(22) Filed: Jun. 11, 2002

(65) Prior Publication Data

US 2003/0226716 A1 Dec. 11, 2003

(51) Int. Cl.[7] .................................................. F01M 11/04
(52) U.S. Cl. .................................... 184/105.1; 285/325
(58) Field of Search ........................ 285/325; 184/105.1, 184/105.2, 105.3

(56) References Cited

U.S. PATENT DOCUMENTS

| 1,838,549 | A | * | 12/1931 | Herb | 184/105.3 |
|---|---|---|---|---|---|
| 1,847,383 | A | * | 3/1932 | Davis | 184/105.3 |
| 1,954,827 | A | * | 4/1934 | Newmark et al. | 184/105.3 |
| 4,310,071 | A | * | 1/1982 | Plow | 184/105.3 |
| 4,332,309 | A | * | 6/1982 | Bereit | 184/7.4 |
| 5,372,283 | A | * | 12/1994 | Schmitkons et al. | 222/145.6 |
| 6,035,969 | A | | 3/2000 | Pyle | |

* cited by examiner

Primary Examiner—Chong H. Kim
(74) Attorney, Agent, or Firm—Banner & Witcoff, ltd.

(57) ABSTRACT

A grease fitting coupler device includes a body member with a slot on one side for engagement with a fitting and a series of passages through the body member connected with a lubrication source. A slidable valve member within the body member is pressurized against the fitting to seal the coupler device while lubricating fluid is passed therethrough.

6 Claims, 2 Drawing Sheets

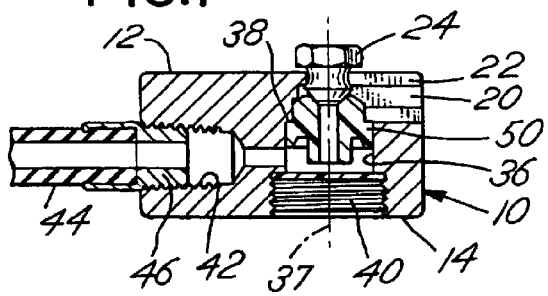
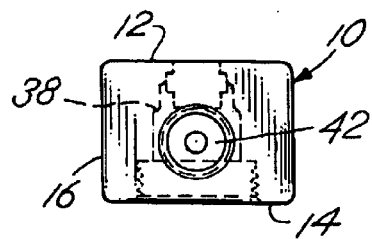
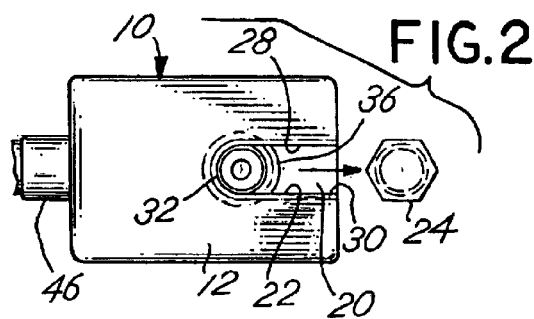
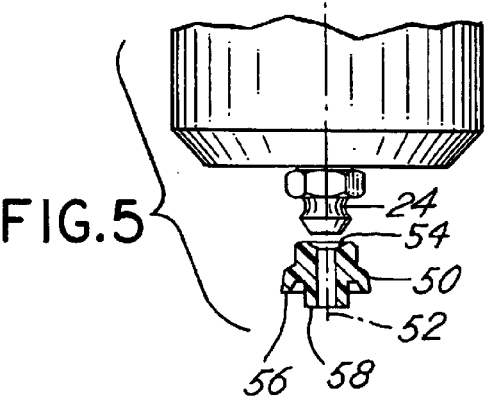
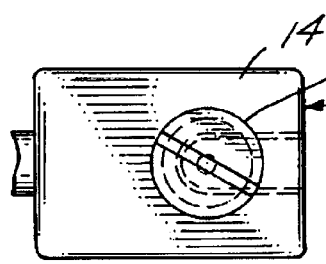
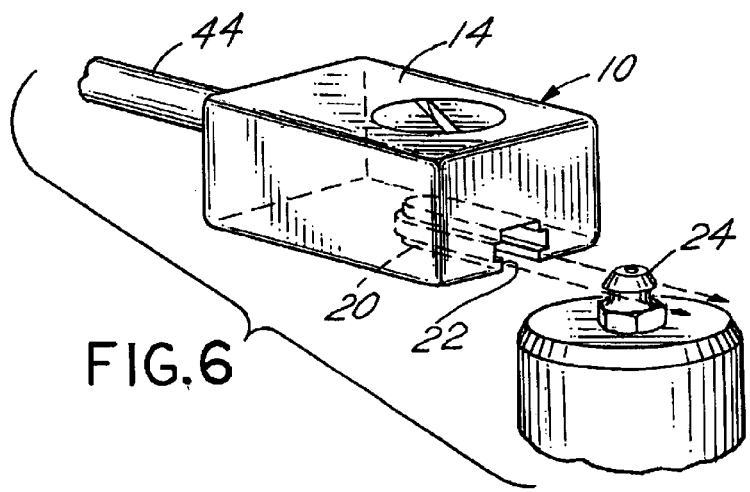

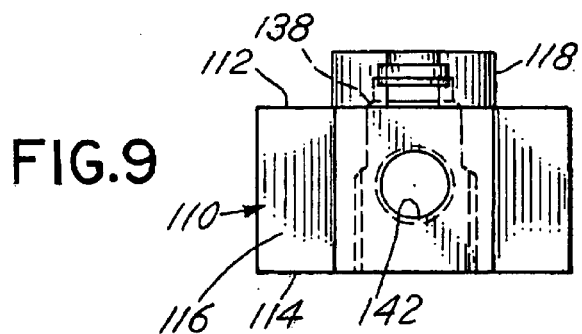
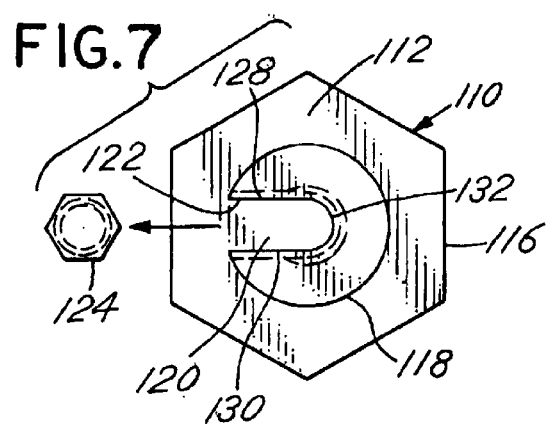
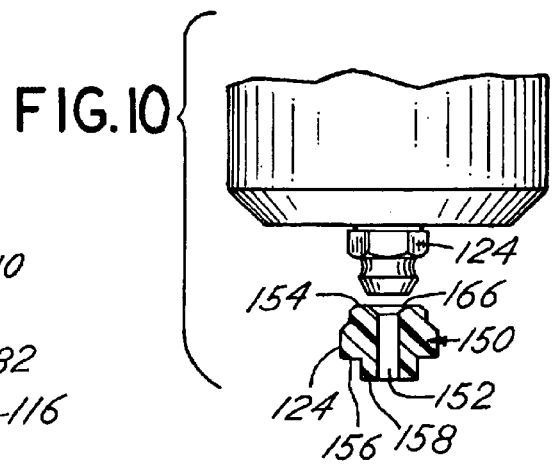
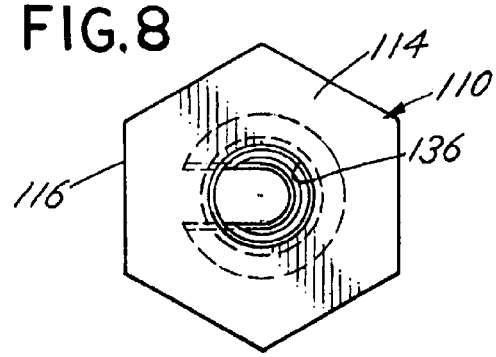
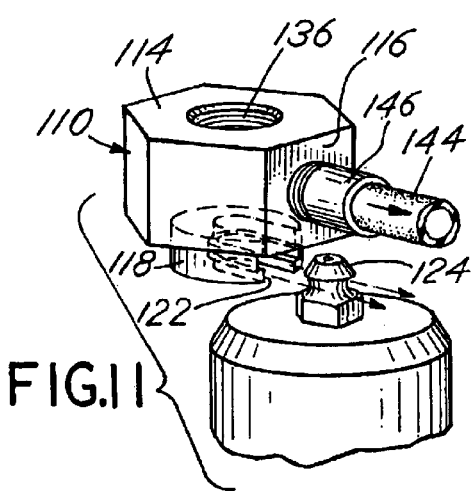

GREASE FITTING COUPLER

BACKGROUND OF THE INVENTION

In a principal aspect, the present invention relates to a coupler device which may be utilized in restricted access areas by attachment to a grease fitting or "zerk" fitting.

When servicing a vehicle such as an automobile or truck, it is typically necessary to couple a source of grease to the grease fittings, often termed zerk fittings, located at strategic positions on the vehicle, for the injection of grease or lubricating materials. Often, the zerk fittings are positioned in restricted spaces. Access to the fittings in order to pump grease or lubricating material into and through the fittings is therefore difficult. As a result, there has developed the need for a mechanism or device for attachment or coupling to a grease fitting from the side of the grease fitting rather than from the top of the fitting.

One known type of device comprises a molded urethane coupler having an open slot at one end. The zerk fitting may then be inserted into the open slot formed in the coupler and retained by a rib molded in the coupler so that grease or lubricating material may be pumped via a tube through the coupler into the grease fitting. The molded elastic retaining rib comprises a detent mechanism which frictionally retains the fitting engaged with the coupler device.

Such a prior art device or coupler is useful and does improve the ability to access zerk fittings located in restricted spaces. However, because such a coupler must be used with fittings having different sizes and shapes, the frictional retention rib does not always successfully insure retention of engagement of the coupler with the fitting, and in some circumstances, the frictional fitting is too difficult to permit engagement with the fitting.

U.S. Pat. No. 6,035,969 entitled "Grease Gun Extension Coupling Device" granted Mar. 14, 2000 discloses another device for attachment to a zerk fitting. An outer tube fits over the neck of the zerk fitting and a rotatable inner tube facilitates locking of the outer tube and the assembly to the fitting while simultaneously serving as a conduit for the grease flow into the fitting. Such a device requires elongate concentric tubes and may not be useful in some restricted areas.

Thus, there has developed a need for an improved mechanism or device for coupling a source of lubricating material from a tube, particularly a flexible tube, to a zerk fitting positioned in a restricted space.

SUMMARY OF THE INVENTION

Briefly, the present invention comprises a grease fitting coupler device which includes a rigid (typically metal) body member having a counterbore opening on one side of the body member with a fitting retention slot and flange around the counterbore opening. The slot extends laterally from the coupler device. The bore is connected with a transverse inlet passage also extending laterally into the body member. Slidably positioned within the bore is a floating slide valve and fluid passage member which includes a surface that may be exposed to the lubricating fluid and thereby forced like a piston into engagement with a zerk fitting that is coupled to the coupler device by engagement with the slot. The slide valve member thus includes a throughpassage through which lubricating material is directed for flow into the zerk fitting. The slide valve member provides multiple functions of tightly sealing the coupler device on the fitting, retaining the coupler on the fitting and providing a passageway for lubricating material to flow from the coupler device into the fitting.

In a first preferred embodiment, a flexible hose or tube, connected to the coupler body member, projects from the body member in the same direction as the fitting engagement slot. Thus, by pulling on the hose, one is able to guide the fitting into the lateral slot of the coupler device and retain the fitting in the slot of the body member upon pressurizing the fluid against the slide valve member. Further, since the slide valve member is in the form of a piston within a bore of the body member and is reciprocal or slidable therein, release of fluid pressure on the slide valve member allows disengagement or release of the valve member of the coupler from the fitting. Thus, the coupler device is useful to positively engage with a fitting whenever lubricating fluid is pumped via the flexible hose through the body member so as to provide a retaining pressure or force of the slide valve member against the fitting, and release when lubricating fluid or grease is not being pumped through the coupler device.

In a second preferred embodiment, the fluid inlet conduit to the coupler extends in a direction distinct from the direction of the fitting retention slot.

It is an object of the invention to provide an improved coupler device for attachment to fittings, such as zerk fittings, located in restricted access spaces.

It is a further object of the invention to provide a coupler device wherein the device provides a positive coupling force for attachment of the coupler device to a fitting during injection of lubricating material through the coupler device and into the fitting.

It is another object of the invention to provide an improved coupler device which is economical, rugged, easy to use and especially adapted for use in restricted spaces.

Another object of the invention is to provide a coupler device with an internal piston slidably mounted in a body member and moveable in response to grease flow through a flexible hose into the body member against the piston to drive the piston against a zerk fitting placed in a slot and aligned with the piston.

These and other objects, advantages, and features of the invention will be set forth in the detailed description which follows.

BRIEF DESCRIPTION OF THE DRAWING

In the detailed description which follows, reference will be made to the drawing comprised of the following figures:

FIG. 1 is a side cross sectional view of a first embodiment of the coupler device of the invention attached to, or coupled with, a zerk fitting;

FIG. 2 is a top plan view of the coupler device of FIG. 1;

FIG. 3 is a bottom plan view of the coupler device of FIG. 1;

FIG. 4 is a lateral side view of the coupler device of FIG. 1;

FIG. 5 is an exploded side elevation of the valve member of the coupler device of the invention of FIG. 1 depicted in combination with a fitting located in a restricted space;

FIG. 6 is an isometric view of the coupler device of the invention of FIG. 1 as it would be positioned upon a fitting located in a restricted space or environment;

FIG. 7 is a bottom plan view of the coupler device of FIG. 11;

FIG. 8 is a top plan view of the coupler device FIG. 11;

FIG. 9 is a lateral side view of the coupler device of FIG. 11;

FIG. 10 is an exploded side elevation of the valve member of the coupler device of the invention of FIG. 11 depicted in combination with a fitting located in a restricted space; and FIG. 11 is an isometric view of the coupler device of the invention of FIG. 11 as it would be positioned upon a fitting located in a restricted space or environment.

DESCRIPTION OF THE PREFERRED EMBODIMENTS

Referring to FIGS. 1–6, a first embodiment of the coupler device includes a body member 10 which has a generally rectangular shape or configuration and includes a generally flat, top side 12 and a generally flat, bottom side 14. The sides 12 and 14 are typically parallel, however, top side 12 is preferably flat. The body member 10 further includes a lateral side 16 which is in the form of a polygon, namely, a rectangle, as depicted in FIGS. 2 and 3. The body member includes a longitudinal slot 20 in top side 12 with an outer flange 22. Slot 20 includes an arcuate inner end and extends through side 16. Thus, a zerk fitting 24 with a rounded head and a neck may slide into the slot 20 and be loosely retained from axial movement by engagement of the fitting 24 with the flange 22. The fitting 24 may have a variety of sizes and shapes. However, the flange 22 in all instances retains the filling in the slot 20 by preventing axial withdrawal. Thus, the slot 20 includes parallel sides 28 and 30 joined by an arcuate connection surface 32 which fits against the outside of the circular cross section shaft of a zerk fitting 24 and serves to align the grease passageway of the zerk fitting 24 with a counterbore 36 in body member 10.

The counterbore 36, with an axis 37, extends from bottom surface 14 through the body member 10 and into the slot 20. The bore 36 includes a circumferential interior seat 38 adjacent the slot 20. A plug or cap 40 is threadably inserted into the bore 36 at the bottom side 14 to hold a valve member 50 as described hereinafter.

Connected with the bore 36 is a transverse inlet passage 42 which extends through lateral side 16 of the body member 10. Thus, a fluid passageway is defined by the inlet passage 42 and bore 36 extending into the region of the slot 20. A flexible conduit or hose 44 attached by a threaded fitting 46 is connected to the inlet passage 42 in the body member or body 10. It is to be noted that the passage 42 is generally parallel with the slot 20, but that passage 42 and slot 20 open in the opposite direction.

The body member 10 has included therein axial slide valve member 50. The slide valve member is in the form of a piston and is slidably mounted within the bore 36, and more particularly, in the unthreaded smooth portion of the bore 36 adjacent the top side 12. The slide valve member 50 includes a center or axial through passage 52 and a circumferential seat 54 which is designed for the purpose of engaging and sealing on the seat 38 of the bore 36 of body member 10. The valve member 50 further includes an annular peripheral face 56 and an inside concentric annular face 58 which define together a piston surface that, when engaged by pressurized fluid, such as grease or lubricating fluid, forces the valve member 50 axially against the seat 38 and the top of the zerk fitting 24. Fluid or grease also may flow through the passageway 52 into fitting 24 to thereby effect lubrication through the fitting 24.

The member 50 is typically made from an elastic or plastic material so as to enhance the sealing characteristics of the valve member 50. For example, urethane plastic material may comprise member 50. The slide valve member 50 is thus slidable within the bore 36 and acts as a piston driven by fluid pressure acting thereon.

In use, the body member 10, and more particularly, the slot 20 is engaged over a fitting 24 and pushed laterally so that the slot 20 is aligned on the fitting 24 as depicted in FIG. 1. Because the hose 44 and the slot 20 are aligned in the opposite direction, pushing on the hose 44 effectively positions the body member 10, and more particularly the slot 20 on fitting 24. After being properly positioned on the fitting 24, fluid is pumped under pressure through the hose 44, lateral passage 42, bore 36, passageway 52 and into the fitting 24. Simultaneously, of course, the valve member 50 is seated tightly against the head of fitting 24 due to the pressure on the annular surfaces 56 and 58. Release of pressure through the hose 44, of course, effects release of the coupler device.

Referring to FIGS. 7–11, a second embodiment of the coupler device includes a body member 110 which has a generally hexagonal shape or configuration and includes a generally flat, top side 112 with a center projection 118 and a generally flat, bottom side 114. The sides 112 and 114 are parallel. The body member 110 further includes a lateral side 116 which is in the form of a polygon, namely, a hexagon, as depicted in FIGS. 7 and 8. Projecting from the top side or face 112 is the fitting projection 118. The fitting projection 118 includes a longitudinal slot 120 with an outer flange 122 so that a zerk fitting 124 may slide into the slot 120 and be restrained from axial movement by engagement of the fitting 124 with the flange 122. The fitting 24 may thus be slidably inserted into the slot 120. The slot 120 includes parallel sides 128 and 130 joined by a radial connection surface 132 which fits tightly against the outside of the circular cross section shaft of a fitting 124.

The body member 110 and projection 118 further include a counterbore 136 which extends from bottom surface 114 through the body member 110 and into the slot 120. The bore 136 includes a circumferential interior seat 138 adjacent the slot 120. A plug or cap 140 is threadably inserted into the bore 136 at the bottom side 114.

Connected with the bore 136 is a transverse inlet passage 142 which extends through a lateral side 116 of the body member 110. Thus, a fluid passageway is defined by the inlet passage 142, bore 136 and into the region of the slot 120. A flexible conduit or hose 144 attached by a thread fitting 146 is connected to the inlet passage 142 in the body member or body 110. It is to be noted that the passage 142 is generally parallel with the slot 120 and both passage 142 and slot 120 open in the same direction.

The body member 110 has included therein a slide valve member 150. The slide valve member is in the form of a piston and is slidably mounted within the bore 136, and more particularly, in the unthreaded smooth portion of the bore 136 adjacent the top side 112. The slide valve member 150 includes a center or axial throughpassage 152 and a circumferential seat 154 which is designed for the purpose of engaging more than sealing on the seat 138 of the bore 136 of body member 110. The valve member 150 further includes an annular peripheral face 156 and an inside concentric annular face 158 which together define a piston surface that, when engaged by pressurized fluid, such as grease or lubricating fluid, forces the valve member 150 axially against the seat 138. Fluid or grease also may flow through the passageway 152 into fitting 124 to thereby effect lubrication through the fitting 124.

The member 150 is typically made from an elastic or plastic material so as to enhance the sealing characteristics of the valve member 150. For example, urethane plastic material may comprise member 150. The slide valve member 150 is thus slidable within the bore 136 and acts as a piston driven by fluid pressure acting thereon.

In use, the body member 110, and more particularly, the slot 120 are engaged over a zerk fitting 124 and pulled laterally so that the slot 120 is aligned on the fitting 124 as depicted in FIG. 6. Because the hose 144 and the slot 120 are aligned in the same direction, pulling on the hose 144 effectively positions the body member 110, and more particularly the slot 120 on fitting 124. After being properly positioned on the fitting 124, fluid is pumped under pressure through the hose 144, lateral passage 142, bore 136, passageway 152 and into the fitting 124. Simultaneously, of course, the fitting 50 is seated tightly against the fitting 124 due to the pressure on the annular surfaces 156 and 158. Release of pressure through the hose 144, of course, effects release of the coupler device.

Variances in the construction may be effected. The sealing arrangement involving seat 38 may be altered or changed to limit travel of member 50. The valve member 50 also preferably includes a frustoconical interior end around passageway 52, namely, frustoconical surface 66 which engages against a compatible surface of the zerk fitting, or grease fitting, 24. Additionally, the orientation of the various bores may be altered, for example. The configuration and shape of the lateral side 16 may be altered. The orientation and configuration of the top and bottom surfaces 12 and 14 may be altered. Thus, the subject matter of the invention is to be limited only by the following claims and equivalents thereof.

What is claimed is:

1. A zerk fitting coupler device comprising, in combination:

a body member having a top side, a bottom side, a lateral side, and a lateral entry slot in the lateral side and bottom side;

a throughbore in the body member connected to the slot and extending between the top side and bottom side of the body member, a transverse inlet passage in the body member connected to the throughbore to define a fluid inlet pathway into the throughbore, said throughbore including a seat intermediate the inlet passage and the slot;

a unitary slide valve member slidably mounted in the throughbore, said valve member including a throughpassage for connecting the inlet passage to the slot, said slide valve member engageable with the seat to limit movement toward the slot; and a plug in the body throughbore coaxial with and opposed to the slide valve member to limit movement of the slide valve member away from the slot;

said slide valve member further including a pressure surface within the throughbore for engagement by fluid in the throughbore from the inlet passage to apply a force of fluid against the pressure surface and a concomitant force of the slide valve member into sealing engagement with the fitting positioned in the slot, said slide valve further including a circumferential seat at one end opposite the pressure surface, said circumferential seat for engaging the zerk fitting whereby the device is mountable on a zerk fitting by sliding the slot over the fitting to align the fitting with the slide valve member throughpassage for flow of fluid into the fitting.

2. The coupler device of claim 1 wherein the slot and transverse inlet passage are substantially parallel.

3. The coupler device of claim 1 further including a fluid conduit connected to the inlet passage.

4. The coupler device of claim 1 further including a retention flange around at least part of the lateral entry slot.

5. The coupler device of claim 1 wherein the slot and inlet passage each extend from the bore in the same direction through the lateral side.

6. The coupler device of claim 1 wherein the slot and inlet passage extend in opposite directions.

* * * * *